Aug. 11, 1970 H. B. CURRIE 3,524,166

CHARACTER READER

Filed Dec. 23, 1966 3 Sheets-Sheet 1

Inventor:
HAROLD B. CURRIE
By John T. O'Halloran
Attorney

Aug. 11, 1970 H. B. CURRIE 3,524,166

CHARACTER READER

Filed Dec. 23, 1966 3 Sheets-Sheet 2

Inventor:
HAROLD B. CURRIE
By John T. O'Halloran
Attorney

CHARACTER READER

Filed Dec. 23, 1966 3 Sheets-Sheet 3

Inventor:
HAROLD B. CURRIE
By John T. O'Halloran
Attorney 3,524,166
CHARACTER READER Harold Burtis Currie, Gibbsboro, N.J., assignor to RCA Corporation, a corporation of Delaware Filed Dec. 23, 1966, Ser. No. 604,466
Int. Cl. G06k 9/00
U.S. Cl. 340—146.3 6 Claims

ABSTRACT OF THE DISCLOSURE

A character reader recognizes distorted characters by detecting their reliable features such as the long vertical stroke that occurs in many characters and the middle horizontal stroke that occurs in some characters. A long vertical stroke is extracted from the distorted characters by detecing the highest and lowest video signals in each scan line. When these reference signals are a prescribed distance apart from each other, the presence of white background therebetween is detected to see if a long vertical stroke can be present. If the amount of white background is below a predetermined minimum, then a long vertical stroke is recorded as present. Middle horizontal strokes are extracted from a character by detecting both the topmost and bottommost video signals throughout the entire character to provide overall reference points and then determining if a horizontal stroke falls intermediate of the two reference points.

Figure 1:
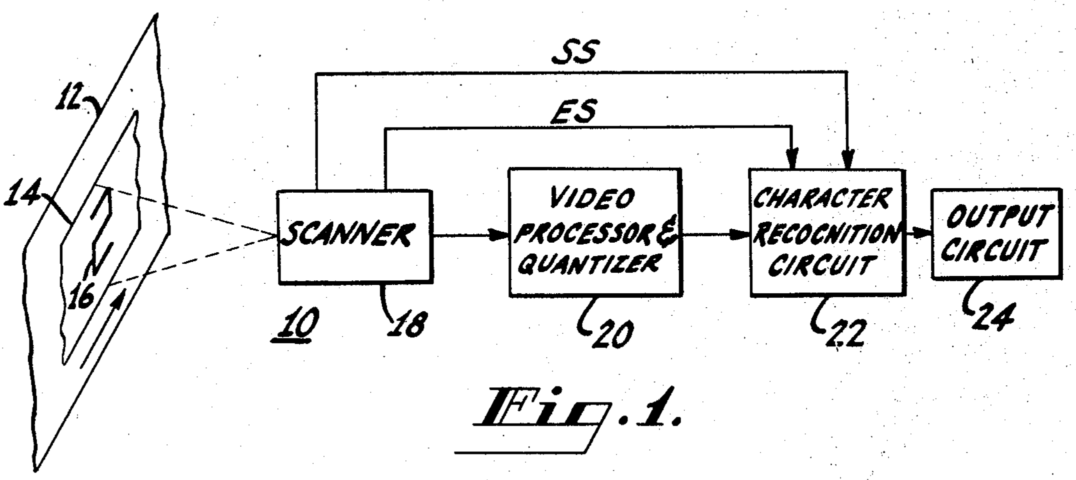

Certain character readers read documents by scanning each character printed on the documents by a plurality of successive scanlines to generate serially occurring video signals. The video signals occur whenever the outline trace of a character is intercepted in a scan line and the succession of video signals represent the topographical features of the character. Such features may, for example, be the vertical and horizontal strokes into which the outline trace of a character is divisible. The character reader recognizes the characters by the distinctive sets of video signals produced when different characters are scanned.

The characters to be read may for example be printed on the documents by a computer operated high-speed printer of the drum type, or the like. In drum printers complete characters are formed on type bars that are successively energized to strike an inked ribbon so as to produce inked impressions of the characters on the document being printed. Such high-speed printers frequently print a distorted version of the character. This is due to the fact that the high rotational speeds of drum printers sometimes cause the type bars to be misaligned when they are energized. The curvature of the drum then causes either the top or the bottom portions of a character to be omitted during printing.

Recognition of distorted characters is difficult. However, such characters may be recognized by predicating recognition on detecting selected reliable features that are normally, always printed by the drum printer. Additionally, accurate information may be extracted even from unreliable features. A stylized font such as a matchstick font may also be utilized in the printing of the characters so that the reliable features of the characters are emphasized. A matchstick font is particularly suitable for printing numeric characters and therefore character readers that read matchstick fonts are normally numeric character readers.

Accordingly, it is an object of this invention to provide an improved character reader capable of recognizing distorted characters.

It is another object of this invention to provide an improved character reader that detects selected reliable features in distorted characters and predicates recognition on detecting these reliable features as well as extracting reliable information from unreliable features.

A character reader embodying the invention detects reliable features in distorted characters such as the long vertical stroke that occurs in many characters and the middle horizontal stroke that occurs in some characters. A long vertical stroke is extracted from distorted characters by detecting the highest and the lowest video signals in each scanline. When these reference signal points are a prescribed distance apart from each other, the presence of white background therebetween is detected to see if a long vertical stroke can be present. If the amount of white background is below a predetermined amount, then a long vertical stroke is recorded as present. Middle horizontal strokes are extracted from a character by detecting both the topmost and bottommost video signals throughout the entire character to provide overall reference points and then determining if a horizontal stroke falls intermediate of the two reference points. Reliable information is extracted from the distorted characters by utilizing the reference points to determine the height of the characters in selected zones of the characters.

Figure 2:
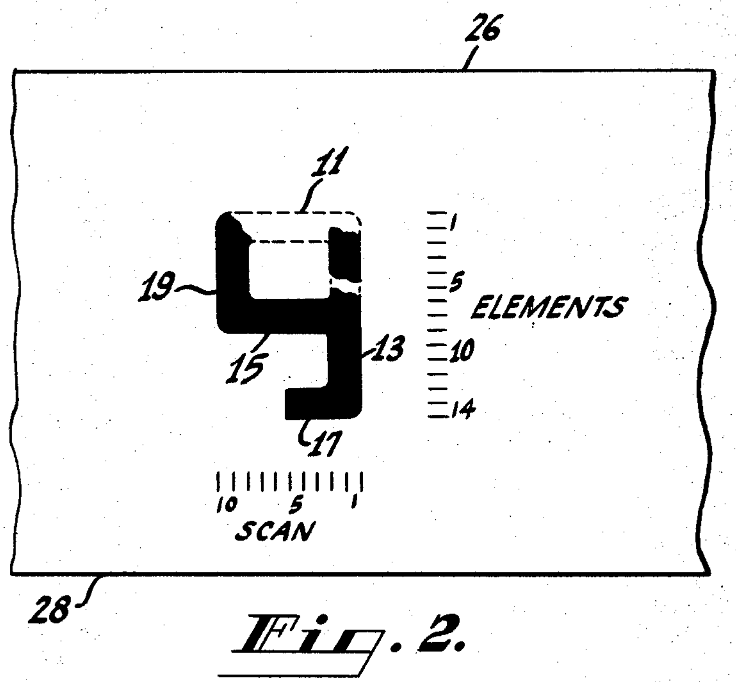
Figure 3A:
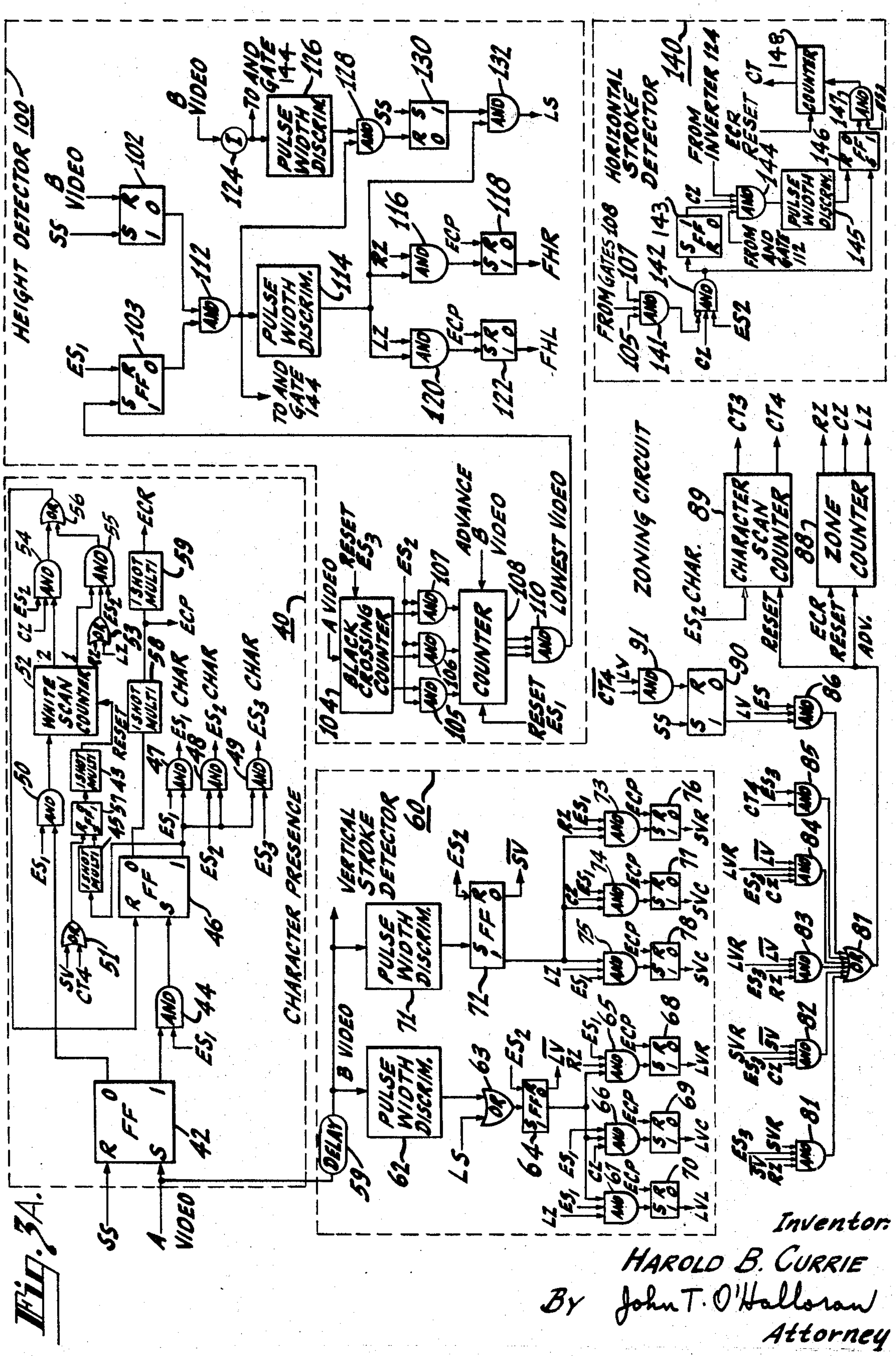
Figure 3B:
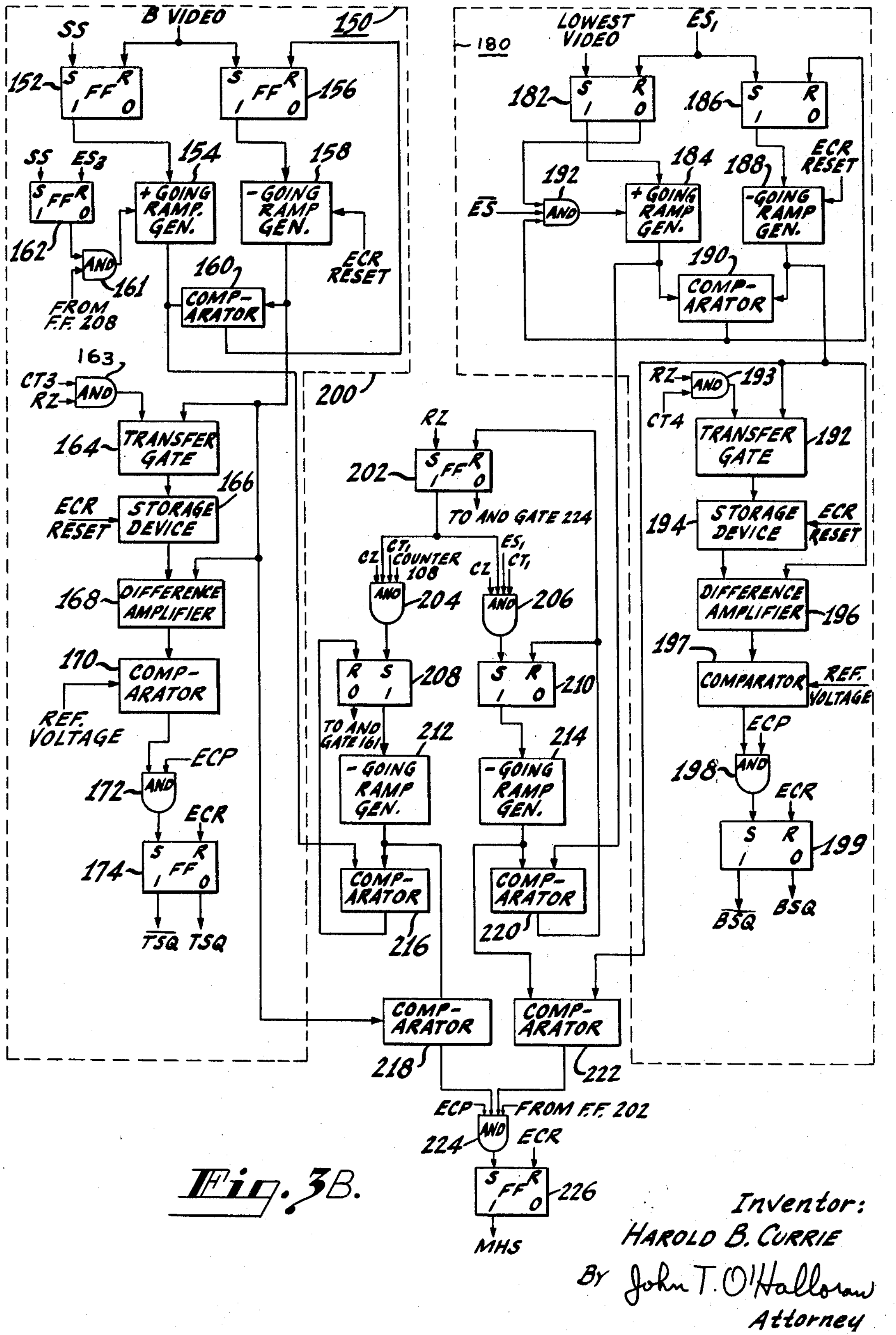

In the drawings:

FIG. 1 is an overall block diagram of the character reader embodying the invention, FIG. 2 is a graphical representation of a distorted character that is read by the character reader of FIG. 1, and FIG. 3, comprising FIGS. 3A and 3B is a detailed schematic block diagram of the character recognition portion of the character reader of FIG. 1.

Referring now to FIG. 1, a schematic block diagram of a character reading system 10 is shown. The system 10 includes a document transport device 12 for transporting documents 14 having characters 16 printed thereon. The document transport 12 transports the documents 14 past the front of a scanner 18 in the direction of the arrow shown on the transport device 12. The scanner 18 may, for example, comprise an electron vidicon tube scanner that scans a single vertical line repeatedly while the document 14 is transported past the scanner at a substantially constant velocity so that an orthogonal scannig raster results. The scanner 18 generates video signals whenever the outline trace of a character is intercepted and the video signals collectively represent the topographical features of a character. The scanner 18 also produces both a start scan pulse (SS) and a plurality of end scan pulses (ES).

The video signals produced in the scanner 18 are applied to a video processing and quantizing circuit 20 that processes the video signals to provide uniform amplitude pulses having fast rise and fall times. The quantized video pulses are applied to a character recognition circuit 22 wherein the distinctive video signals are recognized as separate characters and encoded into a binary form. The binary coded signals are then applied to an output circuit 24 that may, for example, comprise a computer.

In FIG. 2, there is shown the manner in which an individual character is scanned by the scanner 18. The character is a distorted numeral 9 that is missing a top horizontal stroke character (shown dotted) and in which a hairline break is present in the right vertical stroke 13 thereof. The character 9 also includes middle 15 and bottom 17 horizontal strokes as well as a short left vertical stroke 19, which are normally formed. Since the characters are scanned repeatedly from top to bottom while the characters are moved simultaneously from left to right by the document transport 12, each character on the document is scanned by a plurality of scanlines. The number of scanlines utilized to scan a normal width character may, for example, be ten. Ten scanline intervals are shown at the bottom of the numeral 9 in FIG. 2.

Each scanline begins at a beginning line 26 above the character and ends at a terminal line 28 below the character. Each scanline may be considered to be composed of 42 individual timing elements, including 35 elements that occur between the beginning 26 and terminal 28 lines, and 7 elements that occur during retrace back to the beginning line 26. Each element may, for example, comprise 1.1 microseconds in time and, for convenience in explanation throughout the specification, such timing elements are utilized to measure distance and length as well as time. A normal character is 14 elements high and for convenience 14 of such elements are shown to the right of the numeral 9 in FIG. 2.

Referring to FIG. 3A, a detailed schematic block diagram of the character recognition circuit 22 is shown. The character recognition circuit 22 includes a character presence circuit 40 that detects the presence of a character on a document. The quantized video signals as derived from the video processor and quantizer 20 of FIG. 1 are designated as "A video signals," in FIG. 3 and are applied to the set terminal "S" of an input flip-flop 42. The input flip-flop is initially reset at the start of every scan by a start scan (SS) pulse derived from the scanner 18 of FIG. 1. When the flip-flop 42 is set an AND gate 44 is enabled to be activated by an end scan pulse $ES_1$ derived from the scanner 18. There are a plurality of end scan pulses produced in the scanner 18 and they occur in the sequences ES, $ES_1$, $ES_2$, etc. The AND gate 44 is activated at the end of a scan if "black" video signals have set the flip-flop 42 during the scan. A "black" video signal or a "black" scan means the occurrence of a quantized video pulse in a scanline whereas a "white" video signal or a "white" scan means the absence of a video pulse. The activation of the gate 44 causes a character flip-flop 46 to be set, thereby producing a start character signal. The start character signal from the flip-flop 46 is applied to a plurality of AND gates 47, 48, and 49 along with end scan pulses $ES_1$, $ES_2$, $ES_3$, respectively, so that end scan pulses that occur during the presence of a character are produced in the circuit 40.

In the absence of black video signals in a scanline, the input flip-flop 42 remains reset and an enabling signal is applied to an AND gate 50, along with an end scan pulse $ES_1$. The AND gate 50 is therefore activated at the end of each white scanline and the output of the gate 50 is counted by a white scan counter 52. The white scan counter 52 may, for example, comprise a binary counter that produces a plurality of output counts. A white scan count of 2 is applied to an AND gate 54 along with an end scan pulse $ES_2$ as well as a center zone (CZ) signal. A center zone signal (CZ) indicates that the center zone of a character is being scanned. Thus, the AND gate 54 is activated at the end of two white scans in the center zone. A white scan count of 1 is applied to an AND gate 55 along with an end scan pulse $ES_2$ and either a right zone (RZ) signal or a left zone (LZ) signal as desired from an OR gate 53. The gate 55 is therefore activated at the end of a scan when one white scan has been counted in either the right or left zones. An output signal from either of the gates 54 and 55 is coupled through an OR gate 56 to reset the start character flip-flop 46. Thus, when either one white scan has been counted in the right or left zones or two white scans have been counted in the center zone, the flip-flop 46 is reset to denote that a character is not being scanned. The resetting of the flip-flop 46 produces an end character pulse (ECP) from a one-shot multivibrator 58 that is coupled to the "0" output terminal of this flip-flop. A second one-shot multivibrator 59 is coupled to the multivibrator 58 to produce an end character reset pulse (ECR). Recognition occurs on an end character pulse (ECP) while resetting to initial conditions occurs on an end character reset pulse (ECR). To reset the white scan counter 52 a vertical stroke or a count of four character scans as derived from a character scan counter 89 to be described subsequently, is coupled through an OR gate 51 to reset a flip-flop 57. The flip-flop 57 is initially set by a pulse from a one-shot multivibrator 45 that is coupled from the "1" output terminal of the flip-flop 46 to the set terminals of the flip-flop 57. A one-shot multivibrator 43 is coupled from the "0" output terminal of the flip-flop 57 to the reset terminal of the counter 52.

The A video signals derived from the video processor 20 are also applied to a delay circuit 59 that delays each scanline for a one scanline period of one scantime. The delayed video signals are designated throughout the specification as B video signals. The delayed or B video signals are applied to a vertical stroke detector 60 that detects the occurrence of long and short vertical strokes occurring in a character. The vertical stroke detector 60 includes a first pulse width discriminator 62 that is preset to block any video signal pulse having a duration less than 12.1 microseconds or 11 elements long. The discriminator 62 detects a long vertical stroke, which is effectively defined as a stroke having 11 elements of continuous black video. The output of the pulse width discriminator 62 is coupled through an OR gate 63 to set a flip-flop 64 denoting that a long vertical stroke has been detected. The OR gate 63 also has applied to it a long stroke (LS) signal, to be described subsequently. The flip-flop 64 when set produces an output signal from its "1" output terminal to enable a plurality of AND gates 65, 66 and 67. The AND gates 65, 66 and 67 are enabled during the right, center and left zones of a character respectively by corresponding zone signals applied thereto; and are activated at the end of a particular scan by an end scan pulse $ES_1$ if the flip-flop 64 is set. The gates 65, 66 and 67, when activated, set flip-flops 68, 69 and 70, respectively to store stroke signals denoting a long vertical right (LVR), long vertical center (LVC) and long vertical left (LVL) strokes, respectively. The flip-flop 64 is reset at the end of every scanline by an $ES_2$ pulse that occurs subsequently to the $ES_1$ pulse. When reset, the flip-flop 64 produces a $\overline{LV}$ signal designating the absence of a long vertical stroke.

The vertical stroke detector 60 also detects short vertical strokes in a character. A pulse width discriminator 71 is coupled to receive B video signals and is preset to block any signals less than 5.5 microseconds or 5 elements long. Thus effectively a short vertical stroke is defined as a video signal having a duration that is at least 5 elements long. When activated, the pulse width discriminator 71 sets a flip-flop 72. The flip-flop 72 produces an output signal from its "1" output terminal that enables a plurality of AND gates 73, 74 and 75. The AND gates 73, 74 and 75 are also enabled by right, center, and left zone signals, respectively, and are activated by an end scan pulse $ES_1$ when the flip-flop 72 is set. The AND gates 73, 74 and 75, when activated, set flip-flops 76, 77 and 78, respectively to store stroke signals denoting a short vertical right (SVR), a short vertical center (SVC) and a short vertical left (SVL) strokes, respectively.

A zoning circuit 80 is included in the character recognition circuit 22 to divide each character into a plurality or horizontal zones. The zoning of a character is predicated on the detection of transitions to and from vertical strokes in the video signals. The zoning circuit 80 includes a plurality of AND gates 81, 82, 83, 84, 85, and 86, that produce, when activated, zone transition signals that are coupled through an OR gate 87 to a zone counter 88. The AND gate 81 is activated in a scanline in the right zone (RZ) at the end of a scan ($ES_3$) when a short vertical right stroke (SVR) had been previously detected but is now absent from the video signal. This gate 81 detects the transition from a short vertical stroke in the right zone. The AND gate 82 is activated when these conditions occur in the center zone, that is, the detection of the transition from the scanning of a short vertical stroke in the center zone. The AND gate 83 is activated in the right zone (RZ) at the end of a scanline ($ES_3$) wherein the absence of a long vertical stroke is detected after the previous detection of a long vertical stroke (LVR). This gate 83 detects the transition from a long vertical stroke in the right zone. The AND gate 84 is activated when these conditions occur in the center zone. The AND gate 85 is activated at the end of scan ($ES_3$) at a character scan count of 4 ($CT_4$). The AND gate 85 therefore provides a synchronous method of switching zones regardless of the presence or absence of vertical strokes. The character scan count of 4 is derived from a scan counter 89 that is advanced by a count of one on each $ES_2$ pulse when a character is being scanned. The counter 89 is reset by each zone transition signal derived from the OR gate 87. The AND gate 86 is activated by a long vertical stroke (LV) at the end of any scan (ES) wherein a flip-flop 90 is set. The flip-flop 90 is set at the beginning of a scan by a start scan pulse (SS) and reset by an AND gate 91 whenever a long vertical stroke (LV) is detected iny any scan count other than a count of four ($\overline{CT}_4$). The AND gate 86 therefore effectively provides a look ahead circuit wherein a zone transition signal is generated upon the detection of a long vertical stroke in the fourth scan of a zone and is then recorded as occurring in the next zone because such a long vertical stroke signifies the beginning of a new zone.

A height detector 100 is included in the character recognition circuit 22 to detect the height of a character in the left and right zones. The height of a character is measured by the highest and lowest black video signals occurring in a scanline. The height detector 100 includes a first input flip-flop 102 that is set at the start of a scan by a start scan pulse (SS) and reset by a black video pulse in the delayed or B video signal. The detector 100 also includes a second input flip-flop 103 that is set by the last or lowest video signal in a scanline and reset by an end scan pulse ($ES_1$). The lowest video signal in a scanline is obtained by counting every black to white transition or black crossing in the undelayed video signals A in a three stage binary counter 104. At the end of the scan, the complement of the binary count in the counter 104 is transferred via AND gates 105, 106 and 107 to a complementer binary counter 108 and then the counter 104 is reset by an $ES_3$ pulse. The three stage counter 108 counts black to white transitions in the B video signals and is reset by an end of scan pulse $ES_1$. An AND gate 110 is coupled to the counter 108 to set the flip-flop 103 when the lowest black video occurs in a scanline. Thus for example, when reading the right side of the distorted numeral 9 of FIG. 2, a count of 010 is recorded in the black crossing counter 104, signifying two black to white transitions, due to the break in the right vertical stroke 13 thereof. The count is transferred at the end of the scan to the counter 108 as the complementary number 101. The complementer counter 108 then counts the same two black to white transitions to provide a resultant binary count of 111 in the counter 108 at the instant the lowest video signal occurs in the delayed scan.

Before the lowest video is detected, the reset signals generated in the flip-flops 102 and 103 are applied through an AND gate 112 to a pulse width discriminator 114. The pulse width discriminator 114 passes all video signals that are 11 elements in duration, which is a long vertical stroke. The output signal from the discriminator 114 activates an AND gate 116 when such a signal occurs in the right zone of a character. The activation of the gate 116 sets a flip-flop 118 that signals that the character had a full height in the right zone (i.e., FHR). The flip-flop 118 is reset by an end character pulse. Similarly an AND gate 120 is activated in the left zone of a character by the discriminator 114 and sets a flip-flop 122 to signal that the left side of the character has a full height (FHL).

The height detector 100 also includes a long vertical stroke detector that includes an inverter 124 coupled to invert B video signals. The inverted B video signals are applied to a pulse width discriminator 126 that effectively blocks all of the white video signals 2 elements or below. The output of the discriminator 126 as well as that of the AND gate 122 is coupled to activate an AND gate 128. Consequently, the AND gate 128 is activated whenever a white video signal of greater than 2 elements in duration occurs after the detection of the first block video in a scanline but before the detection of the lowest black video in the scanline. The AND gate 128 resets a flip-flop 130 that has been previously set by a start scan pulse. The output from the "1" output terminal of the flip-flop 130 is applied enable an AND gate 132 that is activated by an output signal from the pulse width discriminator 114. Consequently, the AND gate 132 signals a long stroke when a character exhibits a white space of no more than two elements between the top and bottom of the character and the character is at least 11 elements in height. The long stroke signal from the AND gate 132 is coupled to the OR gate 63 in the stroke detector 60 to signal the detection of a long vertical stroke.

A middle horizontal stroke detector 140 is included in the character recognition circuits 22 to detect middle horizontal strokes in the center zone of characters that are not distorted. The detector 140 includes an AND gate 141 that derives its inputs from the outputs of the AND gates 105, 106 and 107. The input from the gate 107 is an inhibit input. Thus the AND gate 141 is activated only on a complementary count of 110 which is effectively a count of a single black crossing. The output of the AND gate 141 is coupled to the inhibit terminal of an AND gate 142. The gate 142 also has a center zone signal (CZ) and an end of scan pulse $ES_2$ applied thereto. Thus the gate 142 is only activated at the end of a scan in the center zone when a single black crossing did not occur in the scan. The AND gate 142 is coupled to set flip-flops 143 and 146. The flip-flop 143 when set applies a signal to an AND gate 144. The other inputs to the gate 144 are a center zone signal (CZ) and the outputs of the AND gate 112 and the inverter 124 in the height detector 100. Thus the AND gate is only activated in the center zone when more than one black crossing has been detected and white video occurs between the highest and lowest video in the scanline. A pulse width discriminator 145 is coupled to the output of the AND gate 144 to block all signals below 6.6 microseconds or below 6 elements. When a white gap longer than 6 elements occurs, the discriminator 145 resets the flip-flop 146. Otherwise, the flip-flop remains set and applies an enabling signal to an AND gate 147 that is locked at the end of the scan by an $ES_3$ pulse. A counter 148 counts each output of the gate 147 and at a count of 4 signals that a middle horizontal stroke occurred. The counter 148 is reset by an ECR reset pulse.

The character recognition circuit 22 also includes cavity detection circuits (FIG. 3B) that detect whether or not a square corner, exists at the top or bottom or both the top and bottom of a character. A top square corner detection circuit 150 includes an input flip-flop 152 that is set by a start scan (SS) pulse to drive a positive going ramp generator 154 until the flip-flop 152 is reset by a black video pulse in the B video signal. The cavity circuit 150 also includes a second input flip-flop 156 which is set by the black video pulse in the B video signal to drive a negative going ramp generator 158. Thus the positive going ramp generator 154 is run from the start of a scan until the first black video in a scan in encountered. At this point the positive going ramp generator 154 stops and the negative going ramp generator 158 begins. The negative going ramp generator 158 keeps running until a comparator 160 compares the signal levels of both the positive and negative going ramp generators 154 and 158 and produces an output when the signal level of the generator 154 is equal to or greater than the signal level of the generator 158. The output of the comparator 160 resets the flip-flop 156 and stops the negative going ramp generator 158. Consequently, at this point both the ramp generators 154 and 158 exhibit an equal signal level that is equivalent to the distance from the start of a scan to the first black video in the scan. The ramp generator 154 is reset by a signal applied from an AND gate 161. The gate 161 is activated by reset signals from flip-flops 208 and 162. The flip-flop 208 is described later. The flip-flop 162 is initially set by a start signal (SS) pulse and reset by an end scan pulse ($ES_3$). The ramp generator 158 retains the signal level that is equivalent to the highest video throughout the scanning of a character until reset at the end of a character. At a scan count of 3 derived from the scan counter 89 (FIG. 3A) in the zoning circuit 80 in the right zone (RZ) an AND gate 163 is activated to transfer the signal level exhibited by the ramp generator 158 through a transfer gate 164 to be stored in a storage circuit 166. Thus at the outset of scanning a character, i.e. scanning the corner of the character, a measurement of the distance to the top of the character is stored in the storage circuit 166. The storage circuit 166 is reset at the end of a character by an end of character pulse (ECR). The output of the ramp generator 158 is also coupled to a difference amplifier 168, along with the signal level stored in the storage circuit 166. The difference amplifier 168 produces an output signal whenever the signal level stored in the storage circuit 166 is greater than the signal level derived from the ramp generator 158. Such a greater signal indicates that the ramp generator 158 output decreased from its level at the initial scan. Such a decrease is due to a higher level in the first black detected in subsequent scans, i.e. a corner that is not square. A comparator 170 then compares the output signal of the difference amplifier 168 with a reference voltage level to detect the size of the cavity detected by the difference amplifier 168. The output of the comparator 170 is coupled through an AND gate 172 to set a flip-flop 174 at the end of a character. The setting of the flip-flop 174 indicates that the top corner of a character is not square ($\overline{TSQ}$). The flip-flop 174 is reset by the ECR signal at the end of a character.

The cavity detection circuits also include a bottom corner detector 180 to detect whether or not the bottom corner of a character is square. The bottom corner detector 180 includes a flip-flop 182 which is set by a lowest video signal generated in the AND gate 110 in the height detector 100 (FIG. 3A). The setting of the flip-flop 182 drives a positive ramp going generator 184. The ramp generator 184 is driven until an end of scan pulse $ES_1$ resets the flip-flop 182. The end scan pulse $kES_1$ also sets a second flip-flop 186, that drives a negative going ramp generator 188. Both the positive going ramp generator 184 and the negative going ramp generator 188 are coupled to a comparator 191 that produces an output signal when the signal level of the generator 184 is equal to or greater than the signal level of the generator 188. The comparator 190 output signal resets the flip-flop 186 to stop the generator 188. The ramp generator 184 is reset by a signal from an AND gate 192 that is generated before the beginning of the next scan $\overline{ES}$. An $\overline{ES}$ signal may be generated by inverting the end of scan pulses. The generator 188 returns during the scanning of the entire character the signal level equivalent to the distance from the lowest black video in a scan to the end of a scan and then is reset at the end of a character. The signal level on the ramp generator 188 is coupled through a transfer circuit 192 to be stored in a storage circuit 194 when the transfer circuit 192 is triggered by an AND gate 193 that is activated by a scan count of 4 (the end of the third scan) from the scan counter 89. The storage circuit 194 is reset by an end character pulse (ECR). The output of the ramp generator 188 is also coupled to a difference amplifier 196 along with the signal stored in the storage circuit 194. When the signal level on the ramp generator 188 is less than the signal stored in the storage circuit 194, the amplifier 196 produces an output signal that is compared with a reference level in a comparator 197. An output from the difference amplifier 196 indicates that the lowest black was detected in subsequent scans of a character and the character exhibits a bottom corner that is not square. The output of the comparator 197 is coupled through an AND gate 198 at the end of a character to set a flip-flop 199 to denote the absence of a bottom square corner ($\overline{BSQ}$). The flip-flop 199 is reset by an end character pulse.

The character recognition circuit 22 also includes a middle horizontal stroke detector 200 for detecting middle horizontal strokes in the center zone of the distorted characters. The detector 200 includes an input flip-flop 202 that is set by a right zone (RZ) signal generated in the zone counter 88. The setting of the flip-flop 202 applies an enabling signal to a pair of AND gates 204 and 206. The AND gate 204 is activated at a count of one in the center zone of a character when a single black crossing is counted in the B video signal in the counter 108. The AND gate 206 is activated at a count of one in the center zone of a character at the end of a scan when a single black crossing has been detected in the counter 108. The activation of the AND gates 204 and 206 sets flip-flops 208 and 210 that in turn drive negative going ramp generators 212 and 214, respectively. The negative going ramp 212 is compared in a comparator 216 with the signal produced in the positive going ramp generator 154 in the top cavity detector circuit 150 and when the inputs to the comparator are equal the comparator 216 resets the flip-flop 208. The ramp generator 212 therefore stores a signal level equivalent to the distance from the top of the scan to the first black video in the scan. This output of the ramp generator 212 is also compared in a comparator 218 with a level equivalent to the highest black in a character that is stored in the ramp generator 158, to produce an output signal when the ramp generator 158 exhibits a greater signal level than the ramp generator 212. This indicates that a horizontal stroke occurred below the highest black in a character. The output of the ramp generator 214 is compared in a comparator 220 with the output of the ramp generator 184 in the bottom corner detector 180. When the signal levels are equal the comparator 220 resets the flip-flop 210 and the flip-flop 202. The ramp generator 214 therefore holds at a signal level that is equivalent to the distance from the lowest black in a scan to the end of the scan. The ramp generator 214 is also compared in a comparator 222 with the output of the ramp generator 188. When the signal level of the ramp generator 214 is greater than the signal level of the ramp generator 188, the comparator 222 produces an output signal denoting that the horizontal stroke is higher than the lowest black in a character. The simultaneous output signals from the comparators 218 and 222 and the resetting of the flip-flop 202 activate an AND gate 224 at the end of a character ECP to set a flip-flop 226. The flip-flop 226, when set, denotes that a middle horizontal stroke has been detected. The flip-flop 226 is reset at the end of a character.

OPERATION

In describing the operation of the character reader system 10, it will be assumed that the distorted numeral 9 shown in FIG. 2 is being read. The first scanline in the plurality of scanlines that start at the beginning line 26 and end at the terminating line 28 and that progress from right to left, intersects the broken long vertical stroke 13 at the top portion thereof. The black video signal derived from intersecting the character sets the flip-flop 42 in the character presence circuit 40 in FIG. 3A and activates the AND gate 44 at the end of this scan. The gate 44 sets the character presence flip-flop 46 to denote that a character is being scanned. This scanline is delayed by one scantime in the delay circuit 59 and is applied simultaneously to the pulse width discriminator 62 and 71 in the vertical stroke detector 60. Inasmuch as a broken line appears in the right zone of the character, the pulse width discriminator 62 does not produce an output signal denoting the presence of the long vertical stroke 13. However, the pulse width discriminator 71 does produce an output signal denoting a short vertical stroke has been detected in the lower half of the broken vertical stroke 13.

The zone counter 88 is reset to the right zone at the end of every character and therefore a right zone (RZ) signal is applied to enable the AND gate 73. The AND gate 73 is activated by the setting of the flip-flop 72 at the end of the scan. The activation of this AND gate 73 records that a short vertical right stroke has been detected in the scanning of numeral 9.

Even though the discriminator 62 does not detect the long vertical stroke 13 since the character is a distorted character, the character height detector circuit 100 does detect the long vertical stroke 13 notwithstanding the distortion of the stroke and also extracts reliable information from the character. At the beginning of the first scan, the flip-flop 102 is set and is reset when the first black video occurs in the scan. The resetting of the flip-flop 102 plus the previous resetting of the flip-flop 103 at the end of the previous scan activates the AND gate 112 and applies a continuous signal to the pulse width discriminator 114. The pulse width discriminator 114 is activated when the AND gate 112 has been conducting continuously for a period of time equal to 11 elements. Such an activation occurs in the numeral 9 because the flip-flop 103 is not set until the lowest black video signal is detected by the counter 108 and AND gate 110. The lowest black video signal occurs in this scan at the position in the character 9 corresponding to the element 14 in FIG. 2. Thus the flip-flop 103 is not reset until at least 11 elements have occurred to produce an output signal from the discriminator 114. The discriminator 114 activates the AND gate 116 to set the flip-flop 118 and record the fact that the character has a full height in the right zone.

The black video pulses in the B video signals are also inverted in the inverter 124 and cause the break in the vertical stroke 13 of the numeral to be applied to the pulse width discriminator 126. Since this hairline break does not extend over 2 elements the discriminator 126 does not activate the AND gate 128 and consequently the flip-flop 130 remains set. The AND gate 132 is therefore enabled to be activated by the discriminator 114 to produce a long stroke signal. The long stroke (LS) signal sets the flip-flop 64 in the vertical stroke detector circuit 60 and activates the AND gate 65 at the end of the scan to cause the flip-flop 68 to store a long vertical right stroke signal. Consequently, regardless of the facts that the top of character 9 in the FIG. 2 is missing and that a break appears in the vertical stroke of this character, the character recognition circuit 22 extracts reliable information from the character.

In the center zone of the numeral 9, the most reliable topographical feature is the presence of the middle horizontal stroke 15. The horizontal stroke detector 140 will not detect the stroke 15 in a character that is as distorted as the numeral 9 because of the absence of the top horizontal stroke 11 and the narrowness of the bottom horizontal stroke 17. The corner detectors 150 and 180 in conjunction with the middle horizontal stroke detector 200 will however detect this reliable feature. The top corner detector 150 stores the topmost black video in the first and subsequent scans of the character 9. At the start of the scan, the flip-flop 152 drives the positive going ramp generator 144 until black video denoting the top of the vertical stroke, appears in the B video signal and resets the flip-flop 152 to halt the ramp generator 154. Thus a signal equivalent to the distance from the beginning line 26 to the top of the stroke 13 in FIG. 2 is stored in the generator 154. The black video also sets the flip-flop 156 to drive the negative going ramp generator 158. This ramp generator runs until the output thereof equals the output of the ramp generator 154. The comparator 160 detects this equivalence and produces an output that sets the flip-flop 156 and halts the ramp generator 158. The ramp generator 154 is reset by the AND gate 161 whereas the ramp generator 158 stores this signal level. Consequently, with the above, the lowest video signal generated by the AND gate 110 in the height detector 100 sets the flip-flop 182 to drive the positive going ramp generator 184. At the end of a scan, the flip-flop 182 is reset and halt the ramp generator 184. The flip-flop 186 is set at the end of the scan to run the negative going ramp generator 188. The generator 188 runs until the output thereof equals the output level of the ramp generator 184. The comparator detects this equivalence to provide an output signal that resets the flip-flop 186 to stop the ramp generator 188 to make it hold at a signal level that is equivalent to the distance from the lowest video in the scan to terminating line 28. A similar sequence occurs in both the top and bottom cavity detectors 150 and 180 during the second scanline. At the end of the second scanline, a scan count of 3 activates the transfer gate 164 to transfer the signal level in the ramp generator 158 to the storage circuit 166.

On the third scan the ramp generator 154 is driven to a higher positive voltage because the first black video that occurs is caused by the middle horizontal stroke 15. The comparator 160 detects this increased signal level before the horizontal stroke 15 is reached to provide an output signal that keeps the flip-flop 156 reset to prevent the ramp generator 158 from being run. Thus the ramp generator 158 retains the same level, i.e. the ramp generator 158 stores the topmost video. The difference amplifier 168 does not produce an output signal and consequently the comparator 170 is not activated. herefore the AND gate 172 also remains disabled and the flip-flop 164 remains set producing a continuous signal denoting that the top of the character 9 is a square corner. Thus regardless of the absence of the top horizontal stroke 11, the numeral 9 is detected as a character having a top square corner which is how a perfect numeral 9 is classified.

The signal level denoting the lowest black video in the character 9 is transferred at the end of the third scanline (a scan count of 4) to the storage device 194. However, the ramp generator 188 is not driven more negatively during the remaining scans of the character so that no output is produced from the difference amplifier 196. Consequently, the comparator 197 and gate 198 remain unactivated and the flip-flop 199 remains reset. Thus a bottom square corner is recorded for the numeral 9.

In the third scan of the character 9, the transition from scanning the long vertical stroke 13 is detected and causes the AND gate 83 to be activated to advance the zone counter 88 to the center zone, as well as reset the character zone counter to a count of 1. The middle horizontal stroke 15, is then detected by the detector 200. Up to the sixth scan of the character 9 more than a single horizontal stroke occurs in a scanline and consequently the detector 200 remains deactivated. In the sixth scan, the flip-flop 208 in the detector 200 is set when the stroke 15 is detected and runs the negative going ramp generator 212 until the voltage level at the generator 212 is equal to level in the ramp generator 154. It is to be recalled that the ramp generator 154 effectively stores the distance from the start of a scan to the highest black video in a scan, which in this scan is the middle horizontal stroke 15. The comparator 216 detects this equivalence to reset the flip-flop 208. The ramp generator 212 therefore holds the effective position of the stroke 15. The comparator 218 compares this position against the position of the highest black signal stored in the ramp generator 158 which is the top of the vertical stroke 13 and produces an output signal enabling the AND gate 224. Consecutively with the above the AND gate 206 is activated at the end of scan six to set the flip-flop 210 to drive the ramp generator 214. The generator 214 runs until its output signal level equals the signal level stored on the ramp generator 184 in the bottom corner circuit 180. It is to be recalled that the signal level in the generator 184 is equivalent to the distance from the stroke 15 until the terminating line 28. The comparator 220 thereupon resets the flip-flop 210 as well as the flip-flop 202. The positon of the middle stroke 15 is compared in the comparator 222 with the lowest video in the character as stored in the ramp generator 188. The comparator 222 produces an output signal denoting that the middle stroke 15 occurred above the lowest black in the character. Thus the stroke 15 is detected as occurring below the topmost black and above the bottommost black in the character. This occurrence defines a middle horizontal stroke. Consequently, the AND gate 224 is activated to set the flip-flop 226 and signal the detection of the middle horizontal stroke 15.

At the end of 4 counts in a center zone the AND gate 85 is activated to produce a zone transition signal to switch the zone counter to the left zone. In this left zone, the short vertical left stroke is detected in the vertical stroke detector 60.

After 2 white scans in the left zone, the white scan counter 52 (FIG. 3A) which had been previously reset by the first scan in the right zone, produces an output that is coupled through an AND gate 55 to reset the flip-flop 46 in the character presence circuit 40. The flip-flop 46 activates multivibrators 58 and 59 to produce end character pulses ECP and ECR respectively. The end character pulse ECP is applied to recognize the character read. The numeral 9 is recognized, for example, by applying the various detected features to an AND gate (not shown) that signal the recognition of this character. The pulse ECR is applied to the various components to reset them to prepare for the next character on the document.

Thus a character reader embodying the invention is capable of reading distorted characters and extracting sufficient reliable information from these characters to recognize the character accurately. The character reader therefore is capable of reading very poor print quality such as that produced by a computer operated high speed printer.

What is claimed is:

1. In a character reader for reading characters from a document, said character reader including means for scanning a character by a plurality of vertical scanlines to derive a video signal whenever the outline trace of said character is scanned, the combination comprising:

first means coupled to said scanning means for detecting the topmost video signal in said scanlines to determine the highest point of said character.

a lowest video signal detector including a black crossing binary counter for counting the number of times said video signal exhibits a transition from scanning said character to scanning the background of said document in an initial scanline, means for transferring said binary count in complementary form to a second counter, means for applying a delayed version of said initial scanline to be counted by said second counter to provide a binary recount of said number of transitions, and means for generating a lowest video signal when said complemented count and said recount add up to the modulus of said counts, second means coupled to said lowest video signal detector for detecting the bottommost video signal in said scanlines to determine the lowest point of said character, means coupled to said scanning means for detecting in a scanline a horizontal stroke in said character, means for measuring the distances of said horizontal stroke from the start of said scanline and from the termination of said scanline, and means for determining when the horizontal stroke occurs intermediate of said highest and lowest character points.

2. The combination according to claim 1 wherein said first means comprises, a first ramp generator initiated at the start of a scanline to generate a first signal having a characteristic corresponding to the distance from the start of said scanline to the top of said character and said second means comprises a second ramp generator initiated at the detection of the lowest video signal in said scanline to generate a second signal having a characteristic corresponding to the distance from the bottom of said character to the end of said scanline.

3. In a character reader for reading characters from a document, the outline traces of said characters being formed of distinctive topographical features, said character reader including means for scanning each of said characters by a plurality of vertical scanlines to provide a video signal whenever the outline trace of each of said characters is scanned, the combination comprising, first means coupled to said scanning means for detecting the first video signal produced in each of said scanlines, second means coupled to said scanning means for detecting the last video signal produced in each of said scanlines, said second means comprising a lowest video signal detector including a black crossing binary counter for counting the number of times said video signal exhibits a transition from scanning said character to scanning the background of said document in an initial scanline, means for transferring said binary count in complementary form to a second counter, means for applying a delayed version of said initial scanline to be counted by said second counter to provide a binary recount of said number of transitions, and means for generating a lowest video signal when said complemented count and said recount add up to the modulus of said counts, and means coupled to said first and second means for generating a height signal when the difference between said first and last video signals in each of said scanlines exceeds a first predetermined minimum duration.

4. The combination in accordance with claim 3 that further includes, a first signal generated by said first means upon the detection of one of said first video signals, a coincidence gate coupled to be activated by said first signal to produce said height signal, a second signal generated by said second means upon the detection of one of said last video signals, means for applying siad second signal to deactivate said coincidence gate to turn off said height signal, and means coupled to said coincidence gate, to determine if the duration of said height signal exceeds a predetermined minimum duration so as to ascertain the height of said characters.

5. The combination in accordance with claim 4 that further includes, means providing an absence signal whenever a video signal is absent in said scanlines, and means for signaling the detection of a long vertical stroke whenever said absence signal is less than a second predetermined minimum duration during the presence of a height signal greater than said first predetermined minimum duration.

6. The combination in accordance with claim 3 that further includes, means coupled to said scanning means for effectively dividing said characters into right, center, and left zones, and means for signaling when a height signal in said right and left zones exceeds said first predetermined minimum duration so as to record the height of said characters in said right and left zones.

(References on following page)

References Cited

UNITED STATES PATENTS

| | | | |
|---|---|---|---|
| 3,072,886 | 1/1963 | Greanias | 340—146.3 |
| 3,081,444 | 3/1963 | Dietrich | 340—146.3 |
| 3,189,873 | 6/1965 | Rabinow | 340—146.3 |
| 3,193,799 | 7/1965 | Holt | 340—146.3 |
| 3,223,973 | 12/1965 | Chatten | 340—146.3 |
| 3,290,650 | 12/1966 | Bailey | 340—146.3 |
| 3,293,604 | 12/1966 | Klein | 340—146.3 |
| 3,346,845 | 10/1967 | Fomenko | 340—146.3 |

THOMAS A. ROBINSON, Primary Examiner

R. F. GNUSE, Assistant Examiner